United States Patent
Momma et al.

(10) Patent No.: US 8,650,138 B2
(45) Date of Patent: Feb. 11, 2014

(54) ACTIVE METRIC LEARNING DEVICE, ACTIVE METRIC LEARNING METHOD, AND ACTIVE METRIC LEARNING PROGRAM

(75) Inventors: Michinari Momma, Tokyo (JP); Satoshi Morinaga, Tokyo (JP); Daisuke Komura, Tokyo (JP)

(73) Assignee: NEC Corporation, Tokyo (JP)

( * ) Notice: Subject to any disclaimer, the term of this patent is extended or adjusted under 35 U.S.C. 154(b) by 272 days.

(21) Appl. No.: 13/130,950

(22) PCT Filed: Nov. 24, 2009

(86) PCT No.: PCT/JP2009/069790
§ 371 (c)(1),
(2), (4) Date: May 24, 2011

(87) PCT Pub. No.: WO2010/061813
PCT Pub. Date: Jun. 3, 2010

(65) Prior Publication Data
US 2011/0231350 A1    Sep. 22, 2011

(30) Foreign Application Priority Data
Nov. 26, 2008   (JP) .................................. 2008-301044

(51) Int. Cl.
*G06F 15/18*    (2006.01)
(52) U.S. Cl.
USPC .......................................................... 706/12
(58) Field of Classification Search
None
See application file for complete search history.

(56) References Cited

U.S. PATENT DOCUMENTS

| 7,010,167 B1 * | 3/2006 | Ordowski et al. | 382/225 |
| 7,272,593 B1 * | 9/2007 | Castelli et al. | 707/600 |
| 2005/0044487 A1 * | 2/2005 | Bellegarda et al. | 715/511 |
| 2010/0004898 A1 * | 1/2010 | Grichnik et al. | 702/179 |

FOREIGN PATENT DOCUMENTS

| JP | 2005235099 A | 9/2005 |
| JP | 2006031460 A | 2/2006 |
| JP | 2008185399 A | 8/2008 |

OTHER PUBLICATIONS

International Search Report for PCT/JP2009/069790 mailed Mar. 2, 2010.
I. S. Dhillon et al., "Information-Theoretic Co-clustering". Proceedings of the Ninth ACM SIGKDD International Conference on Knowledge Discovery and Data Mining(KDD). Aug. 2003, pp. 89-98.

(Continued)

*Primary Examiner* — Kakali Chaki
*Assistant Examiner* — Mario Riojas Ramirez
(74) *Attorney, Agent, or Firm* — Sughrue Mion, PLLC

(57) ABSTRACT

An active metric learning device includes a metric application data analysis unit, a metric optimization unit, and an attribute clustering unit. The metric application data analysis unit is formed with a metric applying module for calculating the distance between data to be analyzed, a data analyzing module for analyzing the data using a predetermined function and the distances between the data to be analyzed and outputting the result of the data analysis, and an analysis result storage unit for storing the result of the data analysis. The metric optimization unit is formed with a feedback converting module for creating side information according to the command of feedback from the user and a metric learning module for generating a metric matrix optimized under a predetermined condition using the created side information. The attribute clustering unit clusters the metric matrix optimized by the metric optimization unit and structuralizes the attributes.

9 Claims, 9 Drawing Sheets

(56) References Cited

OTHER PUBLICATIONS

A. Banerjee et al., "Clustering with Bregman Divergence", The Journal of Machine Learning Research, vol. 6, 2005. pp. 1705-1749.
M. Momma et al., "Learning User's Intension Using Metric Learning", Forum on Information Technology, FIT2008 Koen Ronbunshu, vol. 2, Aug. 20, 2008, pp. 415-416.
X. Zhu, "Semi-Supervised Learning Literature Survey", [online], University of Wisconsin, Madison, Dec. 9, 2006, pp. 29-36.
T. D. Bie et al, "Efficiently Learning the Metric with Side-Information", Lecture Notes in Computer Science, vol. 2842, 2003.
T. Satonaka et al., "Face recognition using feature fusion and information criterion", IEICE Technical Report, vol. 106, No. 268, Sep. 2006, pp. 41-46.

* cited by examiner

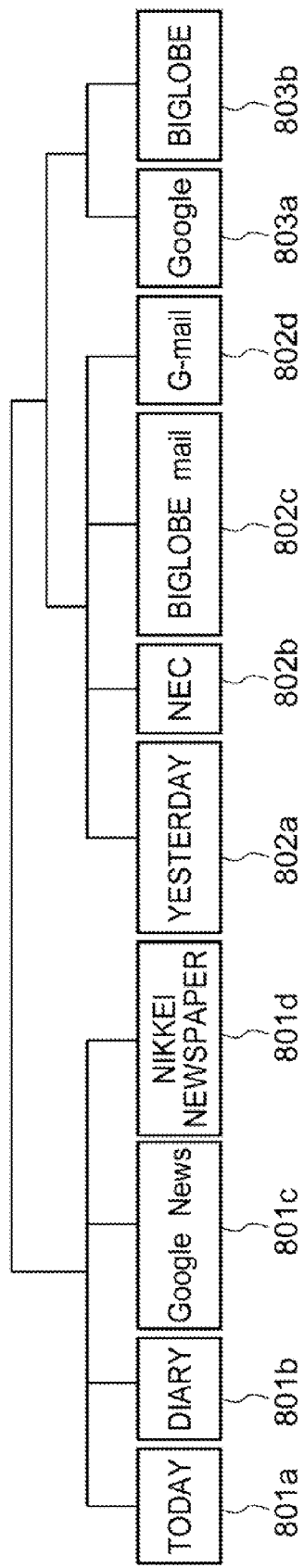

ACTIVE METRIC LEARNING DEVICE, ACTIVE METRIC LEARNING METHOD, AND ACTIVE METRIC LEARNING PROGRAM

TECHNICAL FIELD

The present invention relates to learning of metric used for document clustering and the like. More specifically, the present invention relates to learning of distance metric using attributes having a structure.

BACKGROUND ART

FIG. 9 is an explanatory illustration showing an example of specific document clustering processing executed by a multipurpose active metric learning device. This example herein shows a case where document clustering processing is performed on a vast amount of composition data acquired from various kinds of websites (mainly blogs, bulletin boards, and the like) by utilizing a crawler. FIG. 9 is an example of a part of a result of a hierarchical-clustering acquired from this data, which shows only a small part of a great number of words contained in the document data. Based on the data that is hierarchically clustered in this manner, data used for a search engine and the like can be built, for example.

The active metric learning device used for such document clustering processing is constituted with a user feedback input device, a metric optimization unit, a data analyzing device to which the optimized metric is applied, etc., and it learns the metric based on information from the user. When the user performs data analysis such as document clustering, first, an analysis is executed by using a metric that is not optimized.

The user refers to the result, and feeds it back to the device. Upon that, the device executes metric learning after converting the feedback into a form that can be handled by the metric optimization unit. Thereby, the device provides the user with important information that gives an influence upon a learning result of the metric learning, and increases the efficiency in creating the feedback and learning the metric. Specifically, when optimizing Mahalanobis matrix, used is a feedback regarding Mahalanobis distance (e.g., make the distance between data farther or closer), a direct feedback regarding matrix elements (importance of attributes, relevancy between attributes), etc.

Relative to that, Patent Document 1 discloses one method which structuralizes attributes in clustering processing. Patent document 2 discloses a technique which performs searching of data by using a result acquired by calculating the distance between target feature vectors. Patent Document 3 discloses an example of a technique which specifically uses the calculation of the Mahalanobis distance. As will be described later, Non-Patent Documents 1 and 2 disclose specific methods of clustering, such as Information-theoretic Co-clustering, Bregman Clustering, and spectral clustering.

Patent Document 1: Japanese Unexamined Patent Publication 2005-235099
Patent Document 2: Japanese Unexamined Patent Publication 2006-031460
Patent Document 3: Japanese Unexamined Patent Publication 2008-185399
Non-Patent Document 1: Information-Theoretic Co-clustering, I. S. Dhillon, S. Mallela, and D. S. Modha, Proceedings of The Ninth ACM SIGKDD International Conference on Knowledge Discovery and Data Mining (KDD), pages 89-98, August 2003.
Non-Patent Document 2: Clustering with Bregman Divergences, A. Banerjee, S. Merugu, I. S. Dhillon, J. Ghosh, The Journal of Machine Learning Research, Vol 6, December 2005

DISCLOSURE OF THE INVENTION

Problems to be Solved by the Invention

A metric learning device which calculates analysis target data and the distance between the data and performs clustering based thereupon can be acquired through combining the techniques of Patent Documents 1-3. Such metric learning device is used for processing a vast amount of text data by a search engine, for example, and it faces various following issues.

The first issue is that interpretation of the learnt metric is difficult. The reason is that learning of metric is to adjust the importance of the attributes and the relevancy between the attributes according to a feedback, and the metric optimized as a result is not in a form that can be easily comprehended by the user in terms of the classification of the attributes and the structure of the hierarchical structure based thereupon, for example, even though the importance of the attributes and the relevancy between the attributes can be grasped.

The second issue is that the efficiency of attribute feedback command is poor. The reason is that the feedback is done by a unit of attribute, so that the user cannot give the feedback for a large number of attributes at once. Further, even with the use of a learning function, it is difficult to handle a large number of attributes as long as the target is in a unit of attribute.

The third issue is that the metric learning device does not correspond to the attributes having a hierarchical structure. That is, the metric learning device estimates the optimum data analysis granularity, since the attributes are in the hierarchical structure. The user is supposed to be able to correct the granularity by the feedback. However, the multipurpose techniques are not designed to do so. Inversely, when the data analysis granularity is known in advance, the suitable attribute granularity can be estimated. Further, when a feedback for data is supplied, there ought to be the granularity of the attribute hierarchical structure corresponding to the granularity of the feedback. The multipurpose techniques are not designed to be able to set or estimate the granularity depending on the circumstances.

The granularity herein shows a difference whether a given attribute is a higher-order concept or a lower-order concept. In a case of hierarchically clustered data shown in FIG. 9, "yesterday" 801$a$ and "today" 802$a$ which are originally supposed to be taken as concepts of equal granularity and "diary" 801$b$ which is supposed to be taken as a higher-order granularity are taken as concepts belonging to different clusters of equal granularity, and this cluster classification is definitely inappropriate.

Further, "biglobe mail" 802$c$ and "biglobe" 803$b$ are both the names of services operated by a group company of NEC Corporation, so that it can be said that the granularities of the both are equal. Furthermore, those are lower-order concepts of "NEC" 802$b$, so that it can be said that those are in a same cluster as that of the "NEC" 802$b$ and of a smaller granularity than that of the "NEC" 802$b$. However, in the case shown in FIG. 9, those are not classified so.

Other than those, "google news" 801$c$ and "Nikkei Newspaper" 801$d$ are taken to be belonging to a same cluster, even though those are originally not related directly. Further, "gmail" 802$d$ and the "biglobe mail" 802$c$ are taken to be of a same granularity and belonging to a same cluster, even though those are services operated by different corporate groups. This is the same for "google" 803a and "biglobe" 803b. Other than those, FIG. 9 includes numerous numbers of examples whose hierarchical structures and granularity settings are improper.

With the search engine and the like built based on the data including such inappropriate hierarchical structure and the granularity setting, it is not possible to acquire an apt search result desired by the user. However, with the multipurpose techniques, there has been no method that is capable of correcting the hierarchical structure and the granularity setting when such inappropriate hierarchical structure and the granularity setting are included in the metric learnt by the metric learning device. Patent Documents 1-3 and Non-Patent Documents 1-2 do not mention about such techniques capable of doing that.

The object of the present invention is to provide an active metric learning device, an active metric learning method, and an active metric learning program, which appropriately set the hierarchical structure of attributes and the granularities of the hierarchy to make it possible to acquire an appropriate clustering result thereby.

Means for Solving the Problems

In order to achieve the foregoing object, the active metric learning device according to the present invention is characterized as an active metric learning device for clustering analysis target data having a plurality of attributes, which includes: a metric application data analysis unit which performs calculations and analyses regarding distances between the analysis target data; a metric optimization unit which optimizes correlations and attributes between the analysis target data; and an attribute clustering unit which performs clustering of the analysis target data, wherein: the metric application data analysis unit is formed with: a metric applying module which calculates the distance between the analysis target data by having the analysis target data and a Mahalanobis metric matrix showing the distance between the data as inputs; a data analyzing module which analyzes the data according to a prescribed function by using the distance between the analysis target data and outputs a data analysis result; and an analysis result storage module which saves the data analysis result; the metric optimization unit is formed with: a feedback converting module which creates side information according to a feedback command from a user constituted with either the correlations or the attributes between the analysis target data or with a combination thereof; and a metric learning module which creates a metric matrix that is optimized under a prescribed condition based on the created side information; and the attribute clustering unit performs clustering on the metric matrix that is optimized by the metric optimization unit.

In order to achieve the foregoing object, the active metric learning method according to the present invention is characterized as an active metric learning method for clustering analysis target data having a plurality of attributes, which is used in an active metric learning device that includes: a metric application data analysis unit which performs calculations and analyses regarding distances between the analysis target data; a metric optimization unit which optimizes correlations and attributes between the analysis target data; and an attribute clustering unit which performs clustering of the analysis target data, wherein: the metric application data analysis unit calculates the distance between the analysis target data by having the analysis target data and a Mahalanobis metric matrix showing the distance between the data as inputs; the metric application data analysis unit analyzes the data according to a prescribed function by using the distance between the analysis target data, outputs a data analysis result, and saves the data analysis result; the metric optimization unit creates side information by inputting a feedback command from a user constituted with either the correlations or the attributes between the analysis target data or with a combination thereof; the metric optimization unit creates a metric matrix that is optimized under a prescribed condition based on the created side information; and the attribute clustering unit performs clustering on the optimized metric matrix.

In order to achieve the foregoing object, the active metric learning program according to the present invention is characterized as an active metric learning program for causing a computer, which is provided to an active metric learning device for clustering analysis target data having a plurality of attributes, the active metric learning device including a metric application data analysis unit which performs calculations and analyses regarding distances between the analysis target data, a metric optimization unit which optimizes correlations and attributes between the analysis target data, and an attribute clustering unit which performs clustering of the analysis target data, to execute: a procedure for calculating the distance between the analysis target data by having the analysis target data and a Mahalanobis metric matrix showing the distance between the data as inputs; a procedure executed by the metric application data analysis unit for analyzing the data according to a prescribed function by using the distance between the analysis target data, outputting a data analysis result, and saving the data analysis result; a procedure executed by the metric optimization unit for creating side information according to a feedback command constituted with either the correlations or the attributes between the analysis target data or with a combination thereof; a procedure executed by the metric optimization unit for creating a metric matrix that is optimized under a prescribed condition based on the created side information; and a procedure executed by the attribute clustering unit for performing clustering on the optimized metric matrix.

Effect of the Invention

The present invention is structured to perform clustering processing by optimizing the metric matrix according to the side information created based on a feedback command of the user as described above. Therefore, the analysis target data attribute structure can be optimized to the form suited for human understanding. This makes it possible to appropriately set the attribute hierarchical structure and the granularities of the hierarchy and to acquire the appropriate clustering result thereby.

BRIEF DESCRIPTION OF THE DRAWINGS

FIGS. 8A and 8B show an explanatory illustration showing an example of document clustering processing executed by the active learning device shown in FIG. 1 and FIG. 2, in which FIG. 8A is an example of a part of the result of hierarchical clustering acquired from data and FIG. 8B is an example of a re-clustering result upon which a feedback returned from a user is reflected; and FIG. 9 is an explanatory illustration showing an example of specific document clustering processing executed by a multipurpose active metric learning device.

BEST MODES FOR CARRYING OUT THE INVENTION

Exemplary Embodiment

Figure 1:
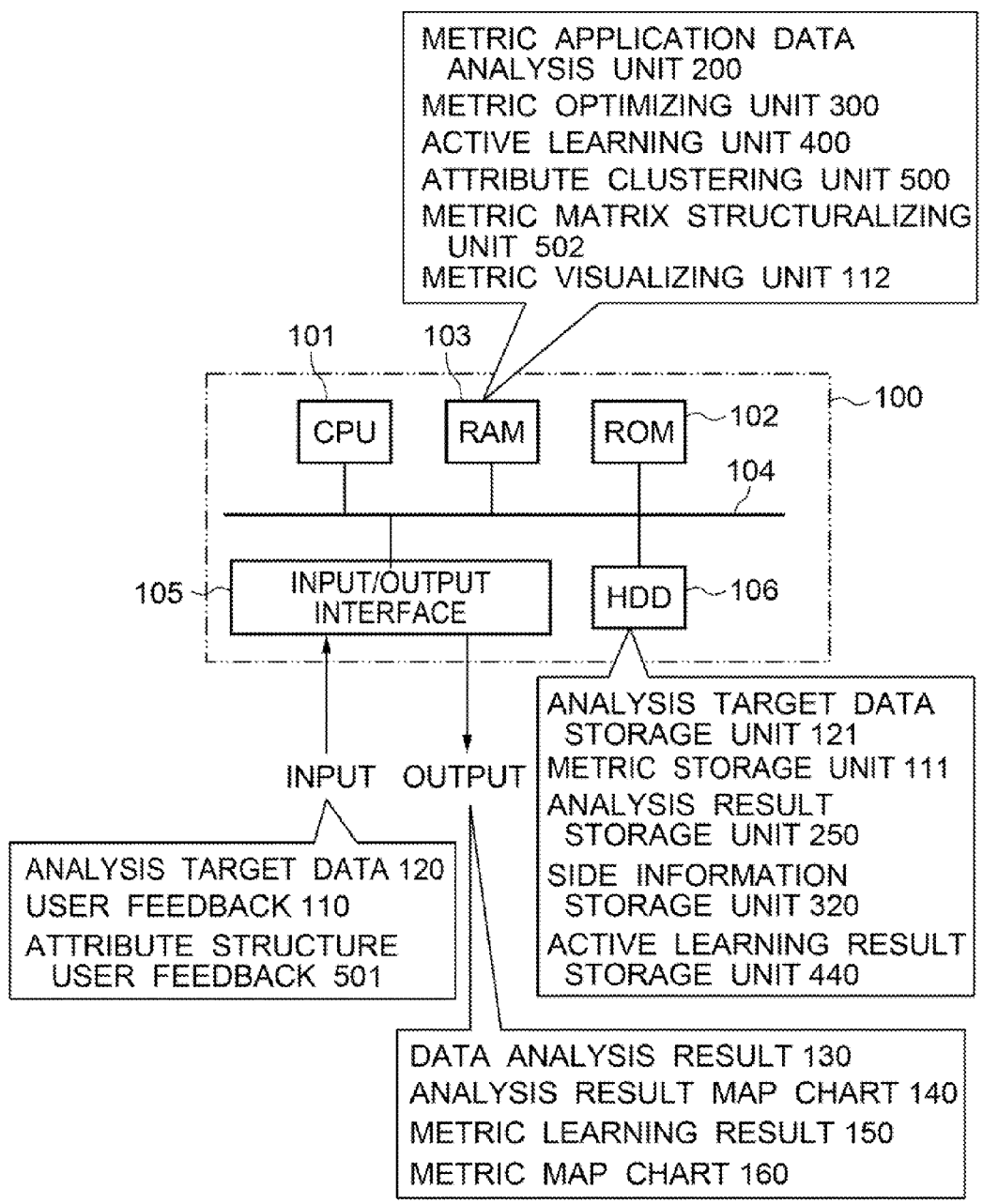
FIG. 1 is an explanatory illustration showing a hardware structure of an active metric learning device according to the present invention.

Hereinafter, the structure of an exemplary embodiment of the invention will be described by referring to FIG. 1 of accompanied drawings.

Basic contents of the exemplary embodiment will be described first, and more specific contents will be described thereafter.

An active metric learning device 100 according to this exemplary embodiment is constituted with a metric application data analysis unit 200 which performs calculation and analysis regarding the distance between analysis target data, a metric optimization unit 300 which optimizes attributes and correlation between the analysis target data, and an attribute clustering unit 500 which clusters the analysis target data, and it is an active metric learning device which clusters the analysis target data having a plurality of attributes. Note here that the metric application data analysis unit 200 is constituted with: a metric applying module 210 which calculates the distance between the analysis target data by having a Mahalanobis metric matrix showing the analysis target data and the distance between the data as an input; a data analyzing module 220 which analyzes the data by a prescribed function by using the distance between the analysis target data and outputs a data analysis result; and an analysis result storage module (analysis result storage unit 250) which saves the data analysis result. Further, the metric optimization unit 300 is constituted with: a feedback converting module 310 which generates side information based on a user feedback command which is constituted with either the correlations or attributes between the analysis target data or with a combination thereof; and a metric learning device 330 which generates an optimized metric matrix under a prescribed condition from the created side information. Furthermore, the attribute clustering unit 500 structuralizes the attributes by clustering the metric matrix that is optimized by the metric optimization unit.

Further, the active metric learning device 100 includes an active learning unit 400 which performs active learning of the analysis target data and stores the result of the active learning based on either the metric data acquired by applying the metric to the analysis target data or the analysis result that is the result acquired by analyzing the metric of the analysis target data or based on a combination of those.

Further, the metric application data analysis unit 200 includes an analysis result output module 230 which applies dimensional conversion on the data analysis result and displays it on a display device.

Furthermore, a metric visualizing module (metric visualizing unit 112) which visualizes the metric created from the side information and displays it on the display device is provided to the metric optimization unit 300.

In the meantime, the active metric learning device 100 includes a metric matrix structuralizing unit 502 which inputs a structuralized distance metric matrix to the metric applying module and the data analyzing module of the metric application data analysis unit, and the metric applying module 210 and the data analyzing module 220 of the metric application data analysis unit 200 reflect the metric matrix structuralized by the metric matrix structuralizing unit upon the distance calculation and analysis.

Meanwhile, the attribute clustering unit 500 performs limited clustering by having a user feedback regarding the attribute structure as an input. The active metric learning device 100 further includes an attribute structure feedback support active learning unit 511 which takes the learnt metric matrix as an input.

With such structure, the exemplary embodiment becomes capable of appropriately setting the attribute hierarchical structure and the granularity of the hierarchy. This will be described in more details hereinafter.

FIG. 1 is an explanatory illustration showing a hardware structure of the active metric learning device 100 according to the present invention. The active metric learning device 100 is a computer device, which includes: a CPU (Central Processing Unit) 101 that is the main body for executing a program; a ROM (Read Only Memory) 102 which is a nonvolatile storage device that stores a target program executed by the CPU 101; and a RAM (Random Access Memory) 103 which is a main storage device that stores the target program read and executed by the CPU 101. Further, various kinds of data and the like required when the CPU 101 executes various kinds of processing are also stored in the RAM 103 as necessary.

An HDD (Hard Disk Drive) 106 is a nonvolatile mass storage device to which programs and various kinds of data are stored. Each of data as an analysis target data storage unit 121, a metric storage unit 111, an analysis result storage unit 250, a side information storage unit 320, and an active learning result storage unit 440 to be described later is stored therein.

The CPU 101, the ROM 102, the RAM 103, an input/output interface 105, and the HDD 106 are connected mutually via a bus 104. The input/output interface 105 is also connected to the bus 104.

A keyboard, a mouse, a display, a speaker, a network adapter (all of them are not shown), and the like are connected to the input/output interface 105, though which various kinds of input data from the user such as analysis target data 120, a user feedback 110, and an attribute structure user feedback 501 to be described later are received and various kinds of output data such as a data analysis result 130, an analysis result map chart 140, a metric learning result 150, and a metric map chart 160 are presented to the user.

Figure 2:
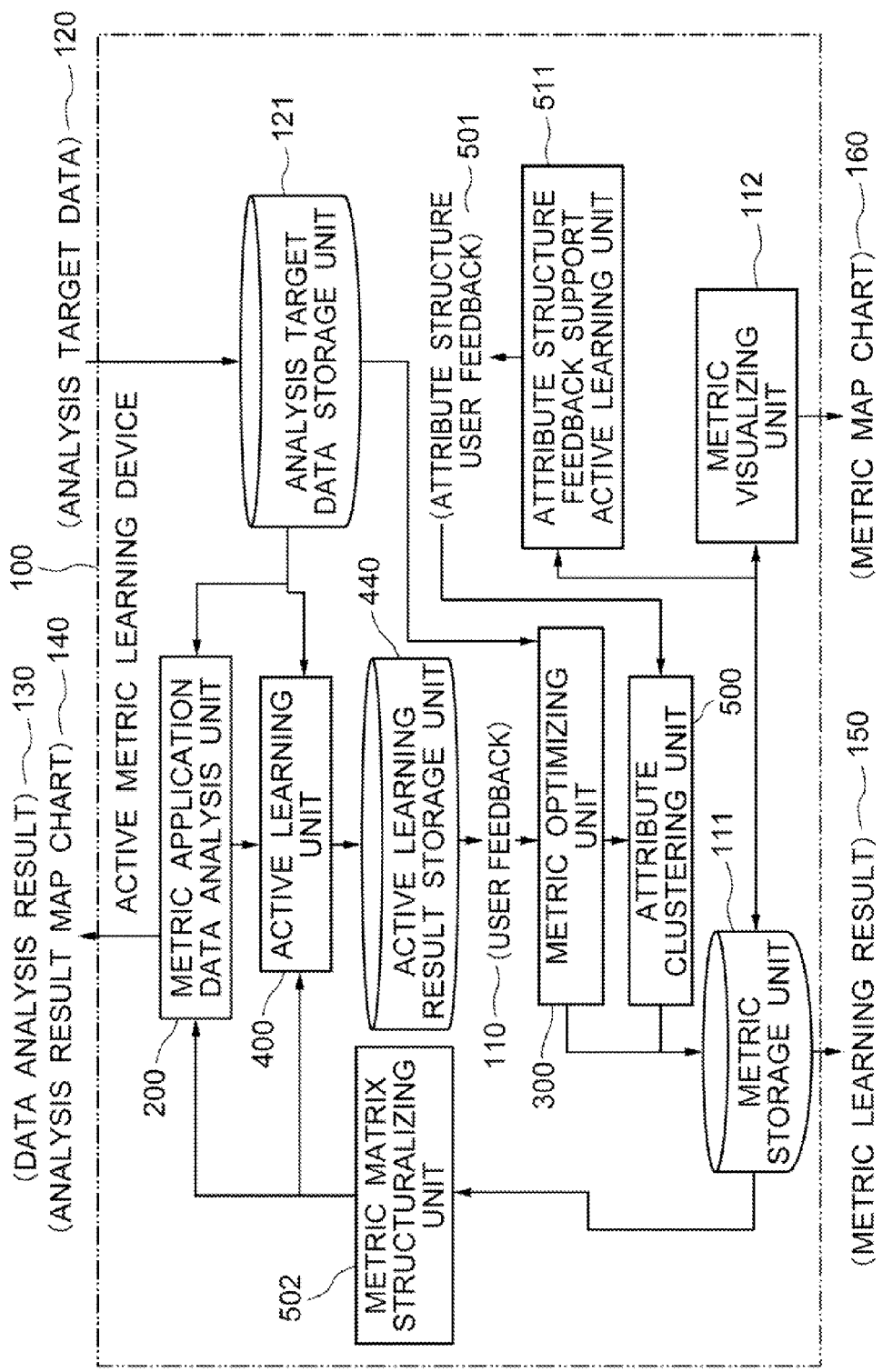
FIG. 2 is an explanatory illustration more specifically showing the structure of software which operates on the active metric learning device shown in FIG. 1.

FIG. 2 is an explanatory illustration which more specifically shows the structure of software operated on the active metric learning device 100 shown in FIG. 1. The active metric learning device 100 is constituted with the metric application data analysis unit 200, the metric optimization unit 300, the active learning unit 400, the attribute clustering unit 500, the metric matrix structuralizing unit 502, the attribute structure feedback support active learning unit 511, and the metric visualizing unit 112. Those are all software read from the HDD 106, stored in the RAM 103, and executed by the CPU 101.

Further, the analysis target data 120 inputted from outside via the input/output interface 105 is stored on the HDD 106 as the analysis target data storage unit 121. A result of later-described processing executed by the active learning unit 400 is stored on the HDD 106 as the active learning result storage unit 440. Further, a result of later-described processing executed by the attribute clustering unit 500 is stored on the HDD 106 as the metric storage unit 111.

The data analysis result 130 and the analysis result map chart 140 outputted from the metric application data analysis unit 200 are outputted to the outside via the input/output interface 105. Further, the metric learning result 150 stored in the metric storage unit 111 and the metric map chart 160 created by the metric visualizing unit 112 from the metric learning result 150 are also outputted to the outside via the input/output interface 105.

The analysis target data 120 contains m-pieces of data, and the number of attributes is n (m and n are both natural numbers of 2 or larger). Further, it is assumed that i is a natural number satisfying 1≤i≤m, and the i-th data is defined as xi. When metric learning is not executed on the data, the user selects an initial metric. The metric application data analysis unit 200 is operated by applying the initial metric. The metric may be of any kinds, as long as it can give a distance. That is, a distance d between data can be given by a function φ shown by a following expression.

$$d(x_i, x_j) = \phi(x_i, x_j)$$ [Expression 1]

The data may be a numerical-value data or may be a symbol. Here, a distance is expressed by a matrix that shows the weight and correlation between attributes as a way of example. That is, the distance between the data xi and xj is shown by a following expression. In the definition of this distance, the data is a vector of a real value. A matrix A is a conversion matrix that gives the importance of the attributes and the relevancy between the attributes, and it is a half positive-definite matrix.

$$d(x_i, x_j) = (x_i - x_j)^T A (x_i - x_j)$$ [Expression 2]

Therefore, when a unit matrix is selected as the initial value, it is equivalent to a case where the weights of the attributes are all "1" and the correlation is "0". The output of the metric application data analysis unit 200 is the data analysis result 130 and the metric map chart 160. The metric map chart 160 shows the meaning of the matrix A (the importance of the attributes, the similarity of the attributes), and the user can acquire additional information and detailed information by an operation such as clicking of a mouse. The user generates a feedback based on the information, and inputs it with a method described later.

The structure of the attribute herein specifically is (flat) grouping (attribute clustering) or hierarchical grouping (grouping with attribute hierarchy), for example. The former is grouping of similar attributes, which can be considered as clustering regarding the attributes. The latter is grouping to which the hierarchical concept is added. The hierarchy herein is a hierarchical relation in terms of the meaning of words such as ontology or a hierarchical classification in a case where the attributes are product codes, for example.

The active learning unit 400 ranks the important data from the result of the analysis or the analysis target data. The important data may be determined according to any indicator, however, it is data with which change may occur in the process of analysis when the information regarding that data is acquired.

The metric optimization unit 300 optimizes the metric based on the analysis target data 120 and the user feedback 110 as the inputs. The output includes a parameter (matrix A of Expression 2) used when calculating the metric and other information acquired at the time of optimization.

Figure 3:
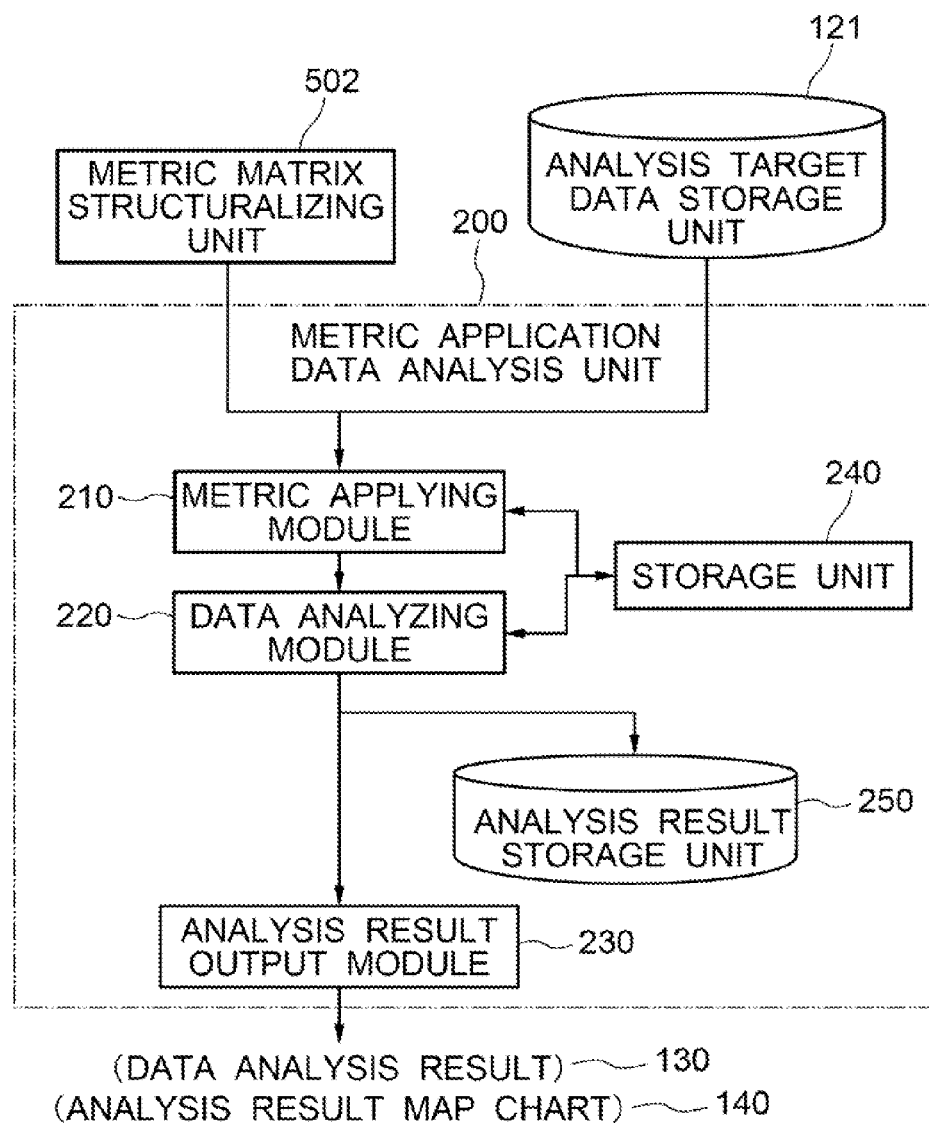
FIG. 3 is an explanatory illustration for more specifically showing the structure of a metric application data analysis unit shown in FIG. 2.

FIG. 3 is an explanatory illustration showing a more specific structure of the metric application data analysis unit 200 shown in FIG. 2. The metric application data analysis unit 200 includes each processing units such as the metric applying module 210, the data analyzing module 220, and the analysis result output module 230. These are all software read from the HDD 106, stored in the RAM 103, and executed by the CPU 101. The storage unit 240 is a part of the RAM 103, which stores the data that is in the middle of the processing executed by those processing units. Further, the analysis results acquired by those processing units are stored on the HDD 106 as the analysis result storage unit 250.

The metric applying module 210 applies the metric outputted from the metric matrix structuralizing unit 502 to the analysis target data 120 stored in the analysis target data storage unit 121. As an applying method to be used may be a method which applies a linear transformation on the analysis target data, i.e., transforms data to x'i=Bxi by using a matrix satisfying A=B'B (e.g., LU transformation or a square root of matrix), or a method which uses Expression 2 described above at the time of calculating the distance.

In a case where there is a structure between attributes, calculation of the matric can be corresponded to that. For example, in a case of flat grouping, a following procedure is to be followed.

First, attribute clustering is applied on the metric matrix A, and the dimension of the matrix is transformed to attribute cluster×attribute cluster. A matrix Ac acquired by this processing is a matrix of blocks, and the i-th row (column) is a contraction of the i-th cluster of the metric matrix A.

Then, the input vector xi is transformed into a vector of a lower dimension by clustering of each attribute. Specifically, xi is transformed into zi shown by a following expression. Note here that L is a transformed matrix of cluster number k×n-dimension. As described above, n is the number of attributes of the analysis target data 120.

$$z_i = L x_i$$ [Expression 3]

Subsequently, the distance is calculated by using a following expression from the matrixes zi, zj, and the metric matrix Ac acquired by the clustering.

$$d(z_i, z_j) = (z_i - z_j)^T A_c (z_i - z_j)$$ [Expression 4]

Further, in a case where the clustering with the attribute hierarchy is applied, first, the above-described processing of attribute clustering is performed for each hierarchy, and then the above-described processing for transforming to the lower dimension shown by a following expression is performed. Note here that Lc is a transformed matrix of cluster number k×n-dimension.

$$z^c_i = L_c x_i, c = 1, \ldots, v$$ [Expression 5]

The distance is calculated by using a following expression from the matrixes zci, zcj, and the metric matrix Ac acquired by the clustering acquired by the processing described above.

$$d(x_i, x_j) = (z^c_i - z^c_j)^T A_c (z^c_i - z^c_j)$$ [Expression 6]

The data to which the metric is applied is analyzed by the data analyzing module which corresponds to the attributes having the structure. The data analysis may be of any kinds as long as it uses the distance between data, such as a classification problem, a regression problem, clustering, a ranking problem, etc. The analysis result output module 230 outputs the data analysis result 130 to a file and a display. Further, the analysis result map chart 140 may be displayed on the display by the metric visualizing unit 112.

The analysis result map chart 140 is a chart that shows the analysis result two-dimensionally or three-dimensionally, which has a function of performing visualization of classes, clustering, and the like, display of data points to original data, display of attributes characterizing the classes and clustering, input of feedback, display of active teaming output, etc.

Figure 4:
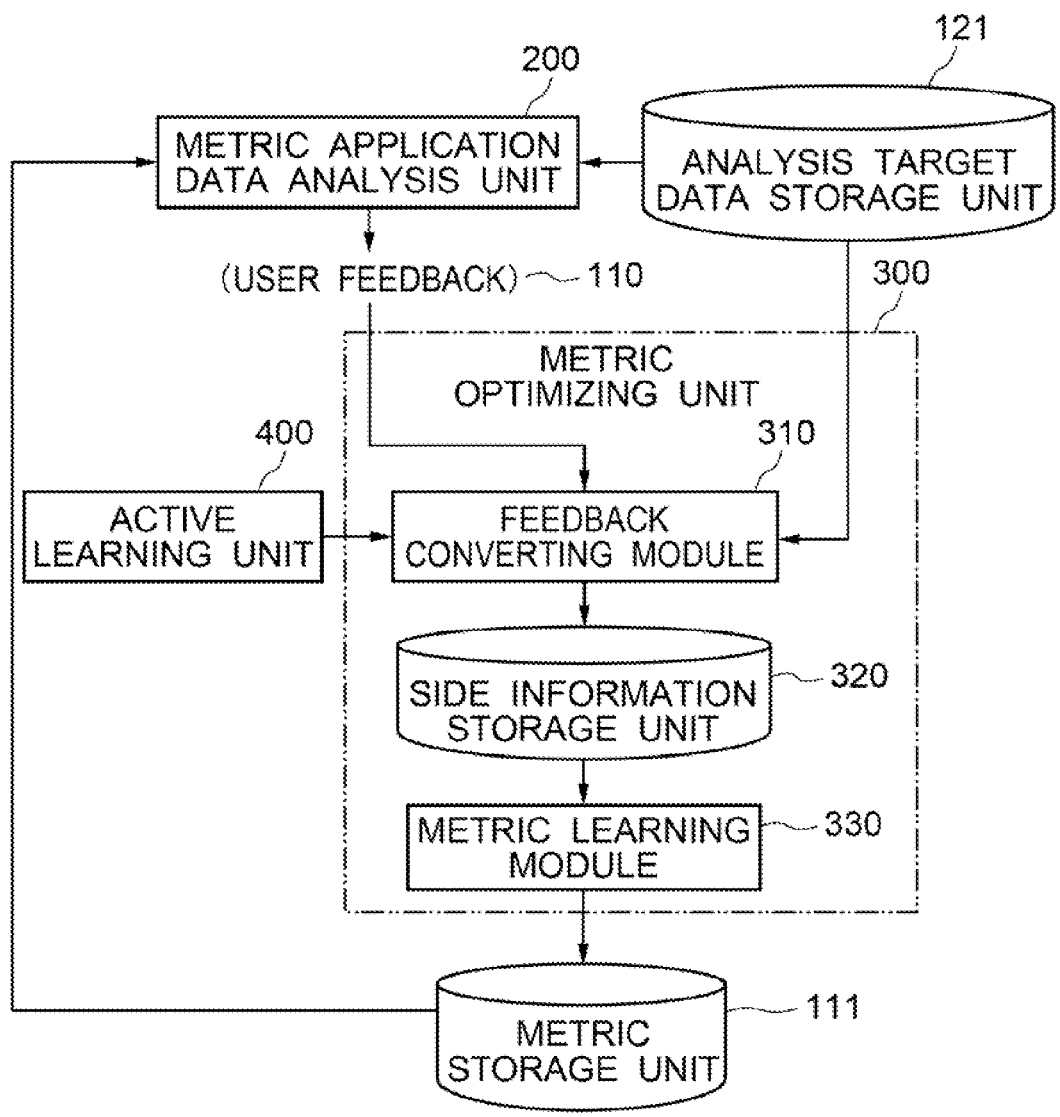
FIG. 4 is an explanatory illustration for more specifically showing the structure of a metric optimization unit shown in FIG. 2.

FIG. 4 is an explanatory illustration which more specifically shows the structure of the metric optimization unit 300 shown in FIG. 2. The metric optimization unit 300 includes each processing unit such as a feedback converting module 310 and a metric learning unit 330. Those are all software read from the HDD 106, stored in the RAM 103, and executed by the CPU 101. A result of the processing executed by the feedback converting module 310 is stored on the HDD 106 as the side information storage unit 320.

Figure 5:
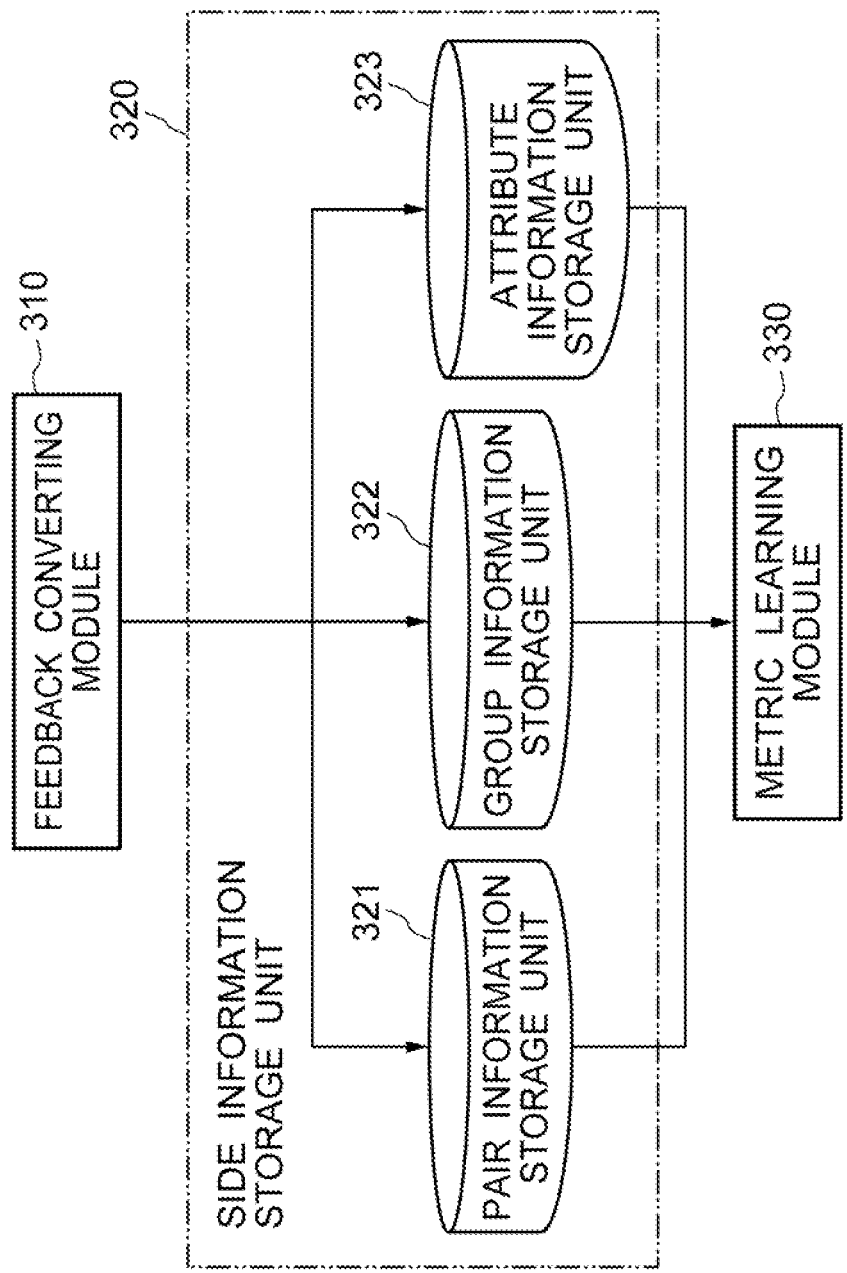
FIG. 5 is an explanatory illustration for more specifically showing the structure of a side information storage unit shown in FIG. 4.

Further, FIG. 5 is an explanatory illustration showing a more specific structure of the side information storage unit 320 shown in FIG. 4. The side information storage unit 320 is divided into three units such as a pair storage unit 321, a group information storage unit 322, and an attribute information storage unit 323, and each of those stores pair information, group information, and attribute information outputted from the feedback converting module 310. The side information herein is a total name for those pieces of information, which is the input data required for metric learning.

The inputs for the metric optimization unit 300 are the user feedback 110 from the user and the analysis target data 120 stored in the analysis target data storage unit 121. Alternatively, it is possible to advance the learning successively from the results of previous metric learning. In that case, the metric learning module 330 reads the previous metric from the metric storage unit 111 shown in FIG. 2 and reflects it upon the metric learning as the initial value.

The user feedback 110 supplied by the operation of the user is converted to the above-described side information by the feedback converting module 310 and saved in the side information storage unit 320. For example, at the time of performing a cluster analysis, the user returns a feedback indicating that a given cluster is unwanted. The feedback is not uniquely comprehended mathematically but may be comprehended to eliminate the data in the cluster, increase dispersion, and decrease the importance of the attribute as the characteristic of the cluster, for example, and comprehension of those depends on the data set and the problem. As described, the feedback converting module 310 converts the output of human beings to a specific module or a mathematical expression.

The metric learning module 330 performs optimization of the metric. The input thereof is the data acquired by converting the feedback into a mathematical expression, i.e., the side information stored in the side information storage unit 320. Optimization of the metric is performed by having a parameter contained in a distance metric to satisfy the feedback as a determined variable. For example, when the distance is supplied with Expression 2 described above, the distance is to satisfy the side information by transforming the matrix A.

There are various forms in the side information. In the present invention, information regarding data set (group) shown by group information, the distance between the data, and relevancy (similarity) in the data set shown by the attribute information is utilized as the side information in addition to the relation of data pair shown by the pair information.

The most basic side information is the information indicating whether the data points as the pair are close or far with respect to each other. When a feedback regarding whether or not a large number of data belong to a same cluster is supplied, the number of pairs required as the side information becomes an order of a square of the number of data. Thus, the scale of the optimization problem becomes large.

In such case, those points are treated as one cluster (group), and a condition that the radius of the group is small, i.e., a condition that the distance from the center of the group to each data point belonging thereto is small, is supplied (group belonging condition). It is to be noted that the group and the cluster are not necessarily same concepts, since the cluster labels are not given to those points. That is, a plurality of groups may belong to a same cluster. Through employing the concepts of the group center and the radius, it is possible to give such a condition that the data points do not belong to a given group this time. This is called a group non-belonging condition.

Further, a relation between the groups is given based on the center and the radius. It is the degree of closeness and remoteness between the groups. The closeness between the groups is expressed as a condition that the distance between the group centers is smaller than the sum of the radiuses. Inversely, the remoteness between the groups is expressed as a condition that the distance between the group centers is larger than the sum of the radiuses. Further, it is also possible to give a condition regarding the importance of the attributes and the relation between the attributes. It is further possible to supply the initial value of the parameter (e.g., matrix A) of the distance metric and give a condition not to be too far from that value. This can be regularization and can also be used as an initial condition when repeatedly performing calculations.

Formularization and implementation of the problem can be done by a multipurpose technique. When there is a structure in the attributes, a metric learning can be performed by a method shown hereinafter through utilizing that structure.

First, in a case where the attributes are in a flat cluster structure, simply, the metric matrix of the attribute unit described above is replaced to a matrix of an attribute cluster unit, and optimization is performed on that matrix.

In a case where the hierarchical clustering is applied on the attributes, optimization is performed by using an expression of the metric matrix for the attributes with the hierarchy to be described hereinafter. In that case, the user feedback regarding the above-described attributes can be treated as a feedback regarding an attribute cluster of a given hierarchical level. Further, the number of parameters to be optimized can be suppressed to a smaller number than the original number of the matrix of attributes×attributes, so that it is advantageous in terms of calculation.

As an output of the metric learning module 330, there are group radiuses, group centers, etc., in addition to the matrix A. Such information is saved in the metric storage unit 111. Further, in a case where the user uses the entire active metric learning device 100 continuously for a plurality of times, the use history information of the user is saved in the metric storage unit 111.

The metric matrix A acquired as a result of the processing executed by the metric optimization unit 300 is clustered by the attribute clustering unit 500. As the clustering method, known methods (e.g., Information-theoretic Co-clustering depicted in Non-Patent Document 1, Bregman Clustering and spectral clustering depicted in Non-Patent Document 2) can be used in a case of simple clustering (has no hierarchical structure). Following points are to be taken into consideration when those methods are used.

The original metric matrix is a symmetric matrix, and the symmetric matrix is divided. Thus, when there is a step for performing clustering in the row direction, it is necessary to perform clustering also in the column direction as well. As an easy example, there is a case of performing clustering by taking that into consideration in the algorithm of the above-described Information-theoretic Co-clustering.

In order to use the attributes with the structure as the matrix of the distance metric, it is necessary to build the metric matrix having the structure. Naturally, the matrix is supposed to be an approximation of the original metric matrix. The metric matrix that is the approximation of the original metric matrix is built by the metric matrix structuralizing unit 502 by corresponding to the attribute structure.

Regarding the clustering of the attributes with the flat structure, the original matrix A is clustered into blocks by reflecting the structure as it is. The values of each block are optimized to be close to the original matrix.

As the clustering of the hierarchical structure, known hierarchical clustering is used. While there are various kinds in the hierarchical clustering, it is necessary to take the two points into consideration as in the case of the no-hierarchical clustering.

Particularly, for those where an objective function is unknown even though an algorithm is given, the matrix of the metric is acquired through solving a minimization problem shown by a following expression. Note here that d is a generalized distance, which shows a square norm and divergence in general. Further, $\gamma_{ic}$ shows the importance of the i-th cluster of level c, and $B_{ic}$ is a block diagonal matrix showing the i-th cluster of the level c. The matrix H is an approximation of the original matrix. When solving the optimization problem of the following expression, there is given such a restriction that H needs to be a half positive-definite matrix.

$$\min d(H,A), H = \Sigma_{c=0}{}^{\prime} \Sigma_i \gamma_i^c B_i^c \quad \text{[Expression 7]}$$

The original metric matrix acquired through the manner described above and the approximation thereof are visualized by the metric visualizing unit 112, and drawn as the metric map chart 160.

The user can give a feedback regarding the structure of the attributes acquired as the metric map chart 160. This feedback is inputted to the attribute clustering unit 500 unlike the user feedback 110 inputted to the metric optimizing device shown in FIG. 2, so that it is illustrated as the attribute structure user feedback 501 in FIG. 2. This is a kind of feedback which indicates whether or not the pair attributes belong to a same cluster. The attribute clustering unit 500 performs re-clustering to satisfy the attribute structure user feedback 501.

The metric visualizing unit 112 is a module which displays the metric parameter A on the display. In the original metric matrix A, it can be comprehended that the diagonal component shows the importance of the attributes and the non-diagonal component shows the similarity between the attributes. This information is visualized on the display. The metric matrix Ac between the clusters is visualized for those on which the non-hierarchical clustering is applied on the attributes, and the approximated matrix H is visualized for those on which the hierarchical clustering is applied.

The metric map chart of the output is an illustration of one of the above-described matrix drawn on a low-dimensional space, from which the importance and the relevancy of the attributes can be known intuitively. It is also possible to return the feedback to the system by directly editing the chart.

An example of the method for visualization will be described. First, an edge is drawn between the attributes of high similarity by using the non-diagonal component of A to draw a graph. Thereafter, coordinates of each attribute in the low-dimensional space are calculated by a multidimensional scaling method, and those are plotted. For example, the weights of the attributes are reflected upon the sizes of the attribute names (words).

The user can directly give the feedback to the system by looking at the map chart. As the feedback, there are two kinds such as "a feedback regarding the importance of the attributes (clusters) and similarity between the attributes (clusters)" (user feedback 110), and "a feedback regarding the attribute structure" (attribute structure user feedback 501). Further, regarding the attribute cluster with the hierarchical structure, it is possible to give a first feedback by a unit of an attribute cluster of each hierarchy level.

The user feedback 110 is a feedback while having the attribute structure fixed, and it is used for the metric optimization learning of a next round. Further, the attribute structure user feedback 501 is for changing the attribute structure, and it is returned to the attribute clustering unit 500 to perform the attribute clustering again. This work can be continued until the user becomes satisfied with the attribute structure on which the clustering is performed.

Figure 6:
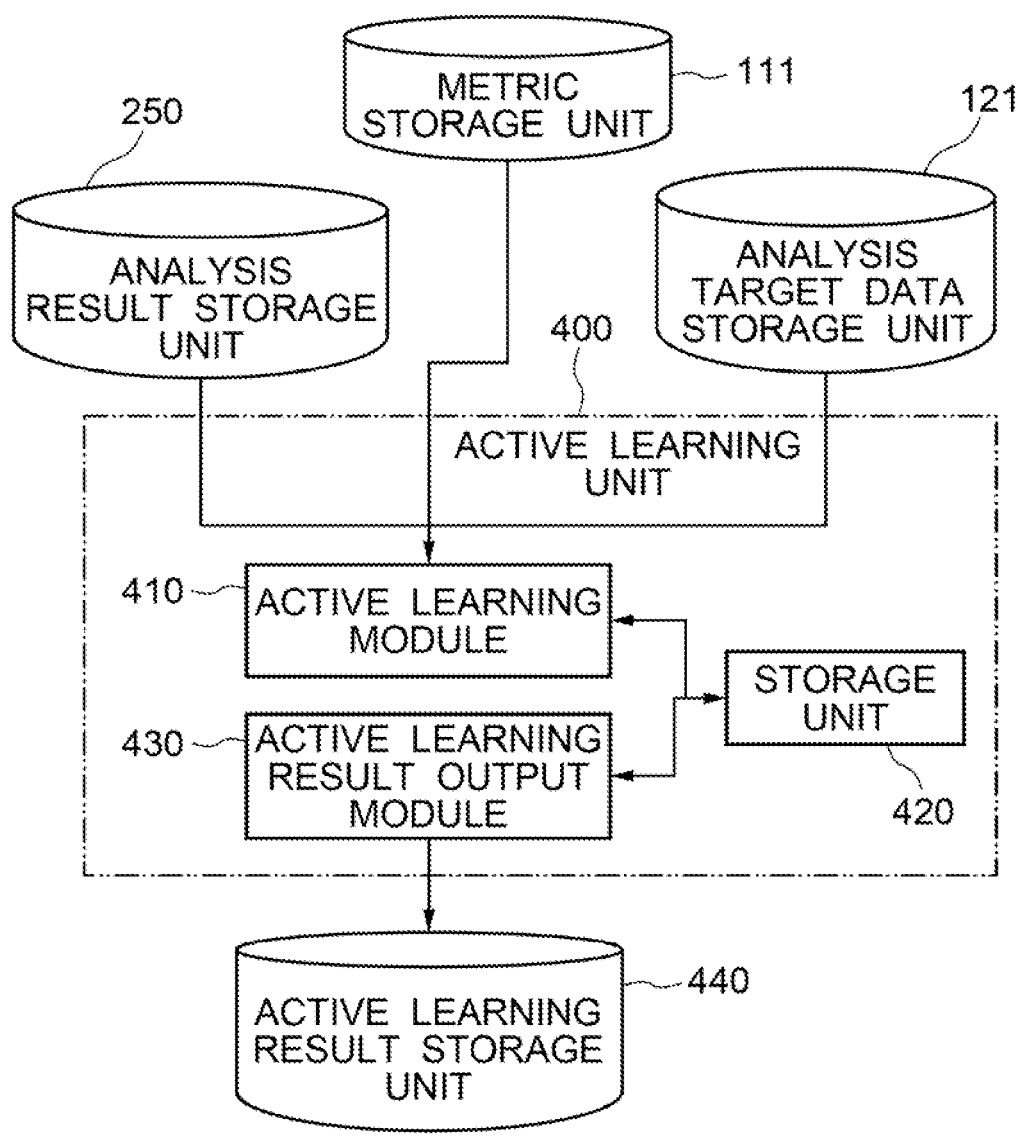
FIG. 6 is an explanatory illustration for more specifically showing the structure of an active learning unit shown in FIG. 2.

FIG. 6 is an explanatory illustration which more specifically shows the structure of the active learning unit 400 shown in FIG. 2. The active learning unit 400 includes each processing unit such as an active learning module 410 and an active learning result output module 430. Both are software read from the HDD 106, stored in the RAM 103, and executed by the CPU 101. A storage unit 420 is a part of the RAM 103, which stores the data in the middle of the processing executed by those processing units. A result of the processing outputted from the feedback converting module 310 is stored on the HDD 106 as an active learning result storage unit 440.

In a case where clustering is not applied on the attributes, the active learning module 410 performs the processing according to the multipurpose technique as it is. In a case where clustering is applied on the attributes, the active learning module 410 executes one of the first to fourth methods described below or a combination of a plurality of those selected therefrom.

The first method is a method which finds the important attribute cluster by using the analysis target data 120 or a result acquired by applying a metric to that data. For finding the attribute clusters, a known experiment planning method can also be used. Further, it is also possible to employ a method which forms a graph from the relevancy between the attribute clusters, and extracts hub points, for example, by using a technique such as a known PageRank (registered trademark). When there is a hierarchical structure in the attribute clusters, such methods are executed for each hierarchy.

The second method is a method which extracts the important attribute cluster for dividing the classes and clusters by using the analysis result stored in the analysis result storage unit 250 and the result acquired by applying the metric on the analysis target data 120. The indicator of the proper importance depends of the problem and data. As a known method, there is a method which gives ranking on the attributes according to the mutual information amount or correlation between the attributes and labels. When there is a hierarchical structure in the attribute clusters, it is performed for each hierarchy.

Further, the third method is a method which predicts a user feedback that may be inputted next based on the metric parameters acquired from the metric storage unit 111, the history thereof, and the correlation between the attribute clusters acquired from the analysis target data 120. For example, when the user returns a feedback indicating that a given attribute cluster is important, the attribute cluster that exhibits a high correlation with that attribute cluster is ranked, and it is presented to the user as a candidate for a next feedback. An attribute which is not in the analysis target data but has a strong relevancy with the important attribute in the data is taken in by using external information (related data, conceptual dictionary or the like such as known wordnet in case of texts). Similarly, extraction of unnecessary attributes and relevancy is executed. When there is a hierarchical structure in the attribute clusters, it is performed for each hierarchy.

Further, the fourth method is a method which extracts the interpretation at the time of converting the feedback by using the information acquired from the user feedback 110. For example, there are a plurality of actions that can be taken, e.g., a feedback indicating that clustering is unnecessary is inputted. In that case, the intention of the user is rechecked. Further, the information that can be extracted automatically from the feedback is calculated, and it is checked with the user. When a feedback indicating that two clusters is considered the same, for example, is returned, the attribute clusters describing it are automatically extracted and presented. When there is a hierarchical structure in the attribute clusters, it is performed for each hierarchy.

At the time of the attribute clustering, any of the first, third, and fourth methods can be employed. The operation may be done according to any of the first to fourth methods or a combination of a plurality of methods selected therefrom. The method may be selected by the user or may be determined in advance.

Figure 7:
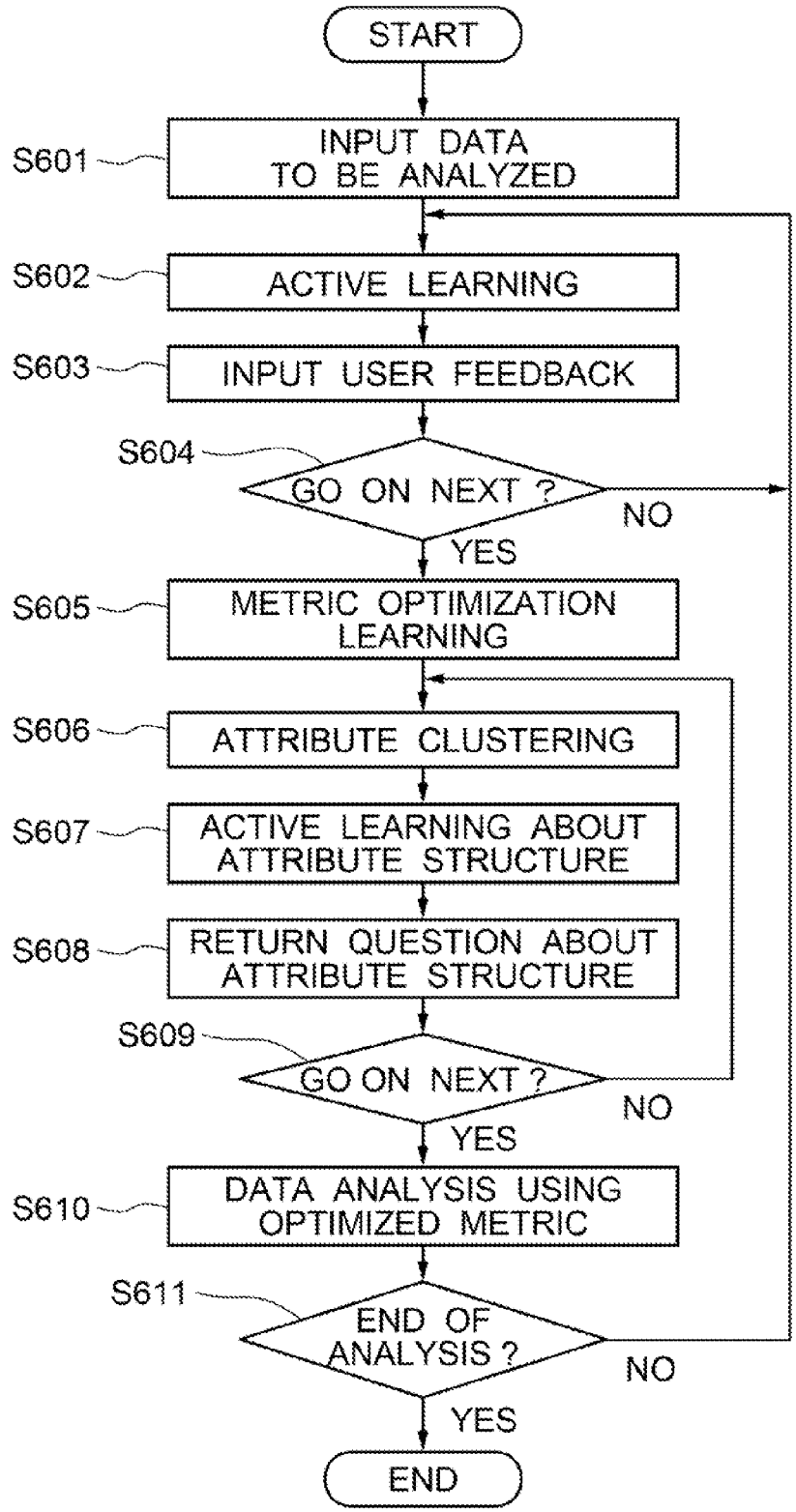
FIG. 7 is a flowchart showing processing executed by the active learning device shown in FIG. 1 and FIG. 2.

FIG. 7 is a flowchart showing the processing executed by the active metric learning device 100 shown in FIG. 1 and FIG. 2. First, when the user inputs analysis target data to the active metric learning device 100 (step S601), the active metric learning device 100 performs active learning on the data (step S602), and extracts the important points and attributes. Then, the user inputs the attribute structure user feedback 501 for the data (step S603). The user selects whether or not to proceed to a next step (step S604). When the user selects not to proceed to the next step, the active metric learning device 100 returns to the step S602 in response to the attribute structure user feedback 501, and continues the active learning.

When the user selects in the step S604 to proceed to the next step, the active metric learning device 100 proceeds to step S605 and thereafter to perform metric optimization learning in response to the attribute structure user feedback 501 inputted in the step S603 (step S605). Further, the active metric learning device 100 performs the attribute clustering by using the metric matrix optimized in the metric optimization learning (step S606). The attribute clustering may be of the kind with or without the hierarchical structure.

Then, the active metric learning device 100 performs the active learning regarding the attribute structure acquired by the attribute clustering (step S607). This step of the active learning may be omitted. In a case where the step of the active learning is executed, the active metric learning device 100 returns a question regarding the attribute structure to the user, and let the user input the response (step S608) and select whether or not to proceed to a next step (step S609).

When the user selects in the step S609 not to proceed to a next step, the active metric learning device 100 returns to the step S607 and further performs the active learning on the data by utilizing the data acquired by the attribute clustering and the active learning executed in the steps S607 and S608 to further optimize the metric data.

When the user selects in the step S609 to proceed to a next step, the active metric learning device 100 performs data analysis by using the metric optimized by the processing executed heretofore (step S610), and presents the analysis result to the user (step S611). The user checks the presented analysis result, and determines whether to end the analysis or to continue the active metric learning (step S612). When continuing the analysis, the active metric learning device 100 returns to the step S602, performs the active metric learning from the result of the data analysis, the metric learning result history, and the like, and continues the analysis.

FIG. 8 is an explanatory illustration showing an example of document clustering processing executed by the active metric learning device 100 shown in FIG. 1 and FIG. 2. FIG. 8 shows an example where a marketer investigates what kinds of topics are discussed about a business corporation in blogs, bulletin boards, and the like on the Internet. First, a vast amount of composition data are acquired from various kinds of websites (e.g., mainly the blogs, the bulletin boards, and the like) by using a crawler.

Words are extracted from the acquired text data and one article is converted into one vector by using a known morpheme analysis program such as Juman. The data on which the processing heretofore is completed is stored in the analysis target data storage unit 121. The active metric learning device 100 performs the active learning regarding the data and the attributes therefrom, and gives questions regarding the data to be a deviation value and regarding the attributes to the user. The results thereof are stored in the active learning result storage unit 440.

In response to the inputted results, the active metric learning device 100 can take two kinds of actions for the corresponding data. One is an action which reduces at least either the unimportant data or attribute. The analysis target data on which such reduction processing has been performed is stored in the analysis target data storage unit 121. The other one is an action which optimizes the metric matrix A to reflect the answer of the user by using the metric optimization unit 300 by having the answer of the user as the user feedback 110. The result of the optimization is stored in the metric storage unit 111.

Figure 8A:
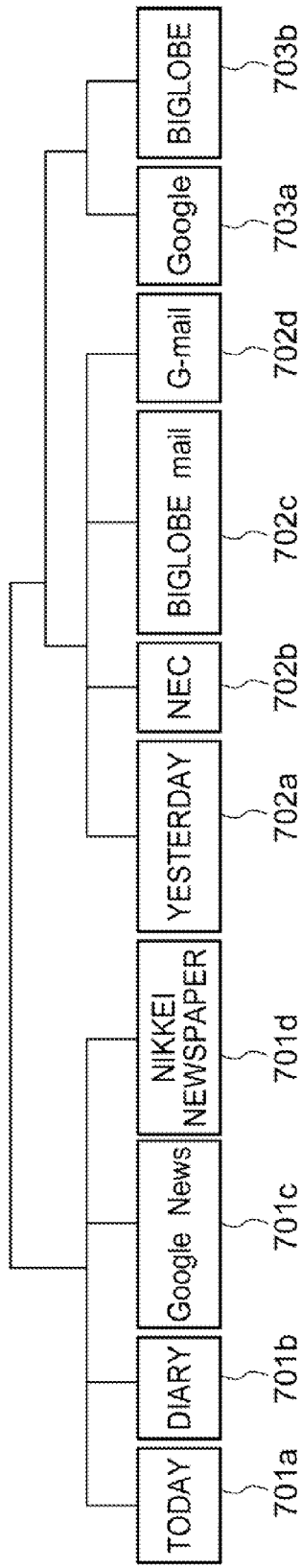

The optimized metric matrix A is clustered by the attribute clustering unit 500. FIG. 8A is an example of a part of the result of the hierarchical-clustering acquired from the data. In this illustration, only a part of a great number of words contained in the document is shown. This shows the same data as that of FIG. 9 described above as an example.

The theme of the analysis in this example is an investigation regarding a business corporation. Thus, "google news" 701c and "Nikkei Newspaper" 701d are not directly related, so that it is clearly inappropriate to say that the both are of the same granularity and similar concepts. Further, it is also inappropriate to say that "gnail" 702d and "biglobe mail" 702c are similar, since those are different business corporations. Similarly, it is also inappropriate to say that "google" 703a and "biglobe" 703b belong to a same cluster.

When the active learning is used, a question about the word which is important for the analysis, such as "do "diary" 701b and "google news" 701c belong to same cluster?" or "do "google" 703a and "google news" 701c belong to different clusters?" is returned to the user. When the active learning is not used, the user checks the illustration presented on the device, and returns the correction attribute structure user feedback 501 regarding the improper part.

The user returns the attribute structure feedback 501 indicating that "yesterday" 702a, "today" 701a, and "diary" 701b are supposed to belong to a same cluster, for example. Further, the user also returns the attribute structure user feedback 501 indicating that "NEC" 702b, the "biglobe mail" 702c, and the "biglobe" 703b belong to a same cluster, and the "NEC" 702b is supposed to be defined as a concept of the roughest granularity among those, for example. As described, the user inputs the words supposed to belong to a same cluster and the setting of the appropriate granularity in that cluster (combination of the higher-order concept and the lower-order concept) as the attribute structure user feedback 501.

Figure 8B:
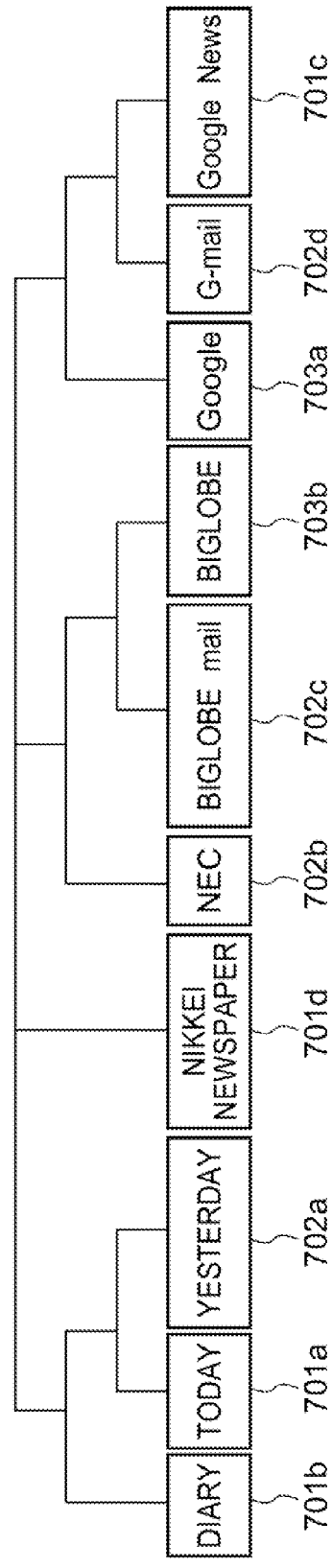

The system side reflects the attribute structure user feedback 501 as limited clustering, and returns the re-clustering result to the user. FIG. 8B is an example of the re-clustering result on which the feedback returned by the user is reflected.

The active metric learning device 100 performs a known limited mixed distribution cluster analysis by the data analyzing module 220 by using the metric matrix A upon which the re-clustering result is reflected. The analysis result is stored in the analysis result storage unit 250.

As the metric matrix A used for the first analysis, used is a unit matrix in which the weights for all the attributes are same and the similarity is "0" when there is no prior information. In a case where there is prior information or in a case where it is desired to start from a previous analysis, for example, an arbitrary matrix is used as the initial matrix of the metric. The metric parameters are saved in the metric storage unit 111.

The result of the cluster analysis stored in the analysis result storage unit 250 is information indicating which of the clusters each of the documents belong to. All the document vectors belonging to each cluster can be found therefrom inversely. Thereby, the cluster centers and cluster radiuses (e.g., the average of the distances from the centers, 75% points, or the like) can be calculated. This calculation is executed by the analysis result output module 230, and the result thereof is stored in the analysis result storage unit 250.

The user can overlook the result from the result displaying chart (cluster map chart) and check the details. The result displaying chart displays the size (the number of belonging data) of each cluster, the cluster radiuses, the characteristic attributes (characteristic words) characterizing each cluster, the number of documents having the characteristic words, a simple statistic amount such as a proportion of the characteristic word appearing in the cluster, etc. Further, there is also provided a link display which shows the layout on which the distance between the clusters is reflected and the cluster similarity.

To the cluster map chart, the user feedback inputs feedbacks of each item such as necessity/unnecessity of cluster, division/coupling of clusters, and connection/cutting of links between clusters by mouse operations while getting hints from the active learning.

Those feedbacks are converted into side information by the feedback converting module 310, and saved in the side information storage unit 320. The metric learning module 330 optimizes the metric parameter by using the side information, and stores the acquired parameter (matrix A) to the metric storage unit 111. The learnt matrix A is outputted by the metric visualizing unit 112 on the display as the metric map chart 160.

The user can look at the metric map chart 160 and returns the attribute structure user feedback 501 regarding the words, the importance of the similarity between the words, the importance of the word clusters, and the similarity between the word clusters to the system. Further, it is also possible to register a word anew, and give the similarity between that word and other words, for example.

The active learning makes inquiries to the user about the adjustment, optimization, and the like of the feedback procedure in addition to giving questions to the user regarding the important data and attributes. That is, the active learning gives the order of the kinds of the optimized feedbacks (e.g., a procedure of selecting an unnecessary cluster first, selecting a necessary cluster next, and giving the feedback regarding the link between the clusters) as a hint, which makes it possible to reduce the number of the entire analysis loops and the time spent for the analysis.

The metric applying data analysis is performed by applying the acquired metric to check whether or not the metric acquired from the feedback is reflected upon the data analysis as intended by the user. In order to improve the result thereof, the user can perform the active metric learning again by including the new feedback. If the acquired result is satisfactory, the learning is ended at that point.

(Entire Operation)

Next, the entire operation of the above-described exemplary embodiment will be described. The operation according to the exemplary embodiment is an active metric learning method which clusters the analysis target data having a plurality of attributes by the active metric learning device 100 which is constituted with: the metric application data analysis unit 200 which performs calculation and analysis of the distance between the analysis target data; the metric optimization unit 300 which optimizes the correlations and the attributes between the analysis target data; and the attribute clustering unit 500 which clusters the analysis target data. The metric application data analysis unit 200 calculates the distance between the data by having the Mahalanobis metric matrix showing the analysis target data and the distance between the data as the input, analyzes the data according to a prescribed function by using the distance metric between the data, outputs the data analysis result, and saves the data analysis result. The metric optimization unit 300 generates the side information by having the feedback command constituted with either the correlations or the attributes between the data or with a combination thereof, and generates the optimized metric matrix under a prescribed condition from the created side information. The attribute clustering unit 500 clusters the optimized metric matrix to structuralize the attributes.

Note here that each of the above-described operation steps may be put into programs that can be executed by a computer and may be executed by the active metric learning device 100 that is a computer directly executing each of those steps.

Through such operations, the exemplary embodiment can provide following effects.

The first effect is that the learnt metric can be easily comprehended by human beings. The reason is that it is difficult to comprehend a vast amount of data since the attributes optimized by the metric learning have the structure. The structure includes classifications, classifications having a hierarchical structure, and the like. The readable degree can be changed through adjusting the structure and the granularity.

The second effect is that creation of the attribute hierarchical structure is done in combination with the metric learning, so that it is possible to build the structure on which the intention of the user can be reflected in a better way than the case of the multipurpose attribute clustering.

The third effect is that it is possible to shorten the calculation time and efficiently execute the works such as creating the feedbacks. This is because the data analysis employing the attribute structure depends on the granularity of the attributes, so that the granularity of the data analysis becomes corresponded to the granularity of the attribute. Further, the attribute structure can be used also for the active learning, so that it can be executed at a higher speed than the case where a large amount of attributes without a structure are required to be handled. It is possible to build ontology customized for the user semi-automatically.

While the present invention has been described heretofore by referring to the specific embodiment illustrated in the drawings, the present invention is not limited only to the embodiment shown in the drawings. Any known structures can be employed therewith, as long as the effects of the present invention can be achieved.

This Application is the National Phase of PCT/JP2009/069790, filed Nov. 24, 2009, which claims the Priority right based on Japanese Patent Application No. 2008-301044 filed on Nov. 26, 2008 and the disclosure thereof is hereby incorporated by reference in its entirety.

INDUSTRIAL APPLICABILITY

The present invention can be applied to an active metric learning device used for processing a vast amount of text data, for example, in a search engine and the like.

REFERENCE NUMERALS

100 Active metric learning device
101 CPU
102 ROM
103 RAM
104 Bus
105 Input/output interface
106 HDD
110 User feedback
111 Metric storage unit
112 Metric visualizing unit
120 Analysis target data
121 Analysis target data storage unit
130 Data analysis result
140 Analysis result map chart
150 Metric learning result
160 Metric map chart
200 Metric application data analysis unit
210 Metric applying module
220 Data analyzing module
230 Analysis result output module
240 Storage unit
250 Analysis result storage unit
300 Metric optimization unit
310 Feedback converting module
320 Side information storage unit
321 Pair storage unit
322 Group information storage unit
323 Attribute information storage unit
330 Metric learning module
400 Active learning unit
410 Active learning module
420 Storage unit
430 Active learning result output module
440 Active learning result storage unit
500 Attribute clustering unit
501 Attribute structure user feedback
502 Metric matrix structuralizing unit
511 Attribute structure feedback support active learning unit

The invention claimed is:

1. An active metric learning device for clustering analysis target data having a plurality of attributes, comprising: a metric application data analysis unit which performs calculations and analyses regarding distances between the analysis target data; a metric optimization unit which optimizes correlations and attributes between the analysis target data and outputs the optimized metric matrix; and an attribute clustering unit which performs clustering of the optimized metric matrix according to the attributes, wherein the metric application data analysis unit is formed with: a metric applying module which calculates the distance between the analysis target data by having the analysis target data and a Mahalanobis metric matrix showing the distance between the data as inputs; a data analyzing module which analyzes the data according to a prescribed function by using the distance between the analysis target data and outputs a data analysis result; an analysis result storage module which saves the data analysis result; and a metric matrix structuralizing unit which inputs a metric matrix that is structuralized by approximating the original metric matrix to the metric applying module and the data analyzing module;

the metric optimization unit is formed with: a feedback converting module which creates side information according to a feedback command from a user constituted with either the correlations or the attributes between the analysis target data or with a combination thereof; and a metric learning module which creates a metric matrix that is optimized under a prescribed condition based on the created side information;

a feedback command from a user regarding the attributes contains information about those that are supposed to belong to a same cluster between the analysis target data and information about a combination of a higher-order concept and a lower-order concept of the analysis target data;

the side information contains pair information that is information about data of two points to be in a same pair among the analysis target data, and group information that is information about data of two points or more to be in a same group among the analysis target data; and the attribute clustering unit performs clustering on the metric matrix that is optimized by the metric optimization unit according to the attributes.

2. The active metric learning device as claimed in claim 1, comprising an active learning unit which performs active learning of the analysis target data based on either one selected from metric data acquired by applying a metric to the analysis target data and an analysis result that is a result acquired by analyzing the metric of the analysis target data or based on a combination thereof, and stores a result of the active learning.

3. The active metric learning device as claimed in claim 1, wherein the metric application data analysis unit includes an analysis result output module which applies a dimensional conversion on the data analysis result and displays it on a display device.

4. The active metric learning device as claimed in claim 1, wherein the metric optimization unit includes a metric visualizing module which visualizes the metric created from the side information and displays it on the display device.

5. The active metric learning device as claimed in claim 1, wherein
the metric applying module and the data analyzing module of the metric application data analysis unit reflect the metric matrix structuralized by the metric matrix structuralizing unit by approximating the original metric matrix on the distance calculation and the analysis.

6. The active metric learning device as claimed in claim 1, wherein
the attribute clustering unit takes a user feedback regarding an attribute structure as an input, and performs limited clustering upon which the inputted attribute structure is reflected.

7. An active metric learning method for clustering analysis target data having a plurality of attributes, which is used in an active metric learning device comprising: a metric application data analysis unit which performs calculations and analyses regarding distances between the analysis target data; a metric optimization unit which optimizes correlations and attributes between the analysis target data and outputs the optimized metric matrix; and an attribute clustering unit which performs clustering of the optimized metric matrix according to the attributes, wherein:
the metric application data analysis unit calculates a metric matrix that is structuralized by approximating the original metric matrix;
the metric application data analysis unit calculates the distance between the analysis target data by having the analysis target data and a Mahalanobis metric matrix showing the distance between the data as inputs;
the metric application data analysis unit analyzes the data according to a prescribed function by using the distance metric between the analysis target data, outputs a data analysis result, and saves the data analysis result;
the metric optimization unit inputs a feedback command containing information which is constituted with either correlations or the attributes between the data or with a combination thereof and is about those that are supposed to belong to a same cluster between the analysis target data and containing information about a combination of a higher-order concept and a lower-order concept of the analysis target data, and creates side information containing pair information that is information about data of two points to be in a same pair among the analysis target data and group information that is information about data of two points or more to be in a same group among the analysis target data;
the metric optimization unit creates the optimized metric matrix under a prescribed condition from the created side information; and
the attribute clustering unit performs clustering on the optimized metric matrix according to the attributes.

8. A non-transitory computer readable recording medium storing an active metric learning program for causing a computer, which is provided to an active metric learning device for clustering analysis target data having a plurality of attributes, the active metric learning device comprising a metric application data analysis unit which performs calculations and analyses regarding distances between the analysis target data, a metric optimization unit which optimizes correlations and attributes between the analysis target data and outputs the optimized metric matrix, and an attribute clustering unit which performs clustering of the optimized metric matrix according to the attributes, to execute:
a procedure for calculating a metric matrix that is structuralized by approximating the original metric matrix;
a procedure executed by the metric application data analysis unit for calculating the distance between the analysis target data by having the analysis target data and a Mahalanobis metric matrix showing the distance between the data as inputs;
a procedure executed by the metric application data analysis unit for analyzing the data according to a prescribed function by using the distance metric between the analysis target data, outputting a data analysis result, and saving the data analysis result;
a procedure executed by the metric optimization unit for inputting a feedback command containing information which is constituted with either correlations or the attributes between the data or with a combination thereof and is about those that are supposed to belong to a same cluster between the analysis target data and containing information about a combination of a higher-order concept and a lower-order concept of the analysis target data, and for creating side information containing pair information that is information about data of two points to be in a same pair among the analysis target data and group information that is information about data of two points or more to be in a same group among the analysis target data;
a procedure executed by the metric optimization unit for creating the optimized metric matrix under a prescribed condition from the created side information; and
a procedure executed by the attribute clustering unit for performing clustering on the optimized metric matrix according to the attributes.

9. An active metric learning device for clustering analysis target data having a plurality of attributes, comprising: metric application data analysis means for performing calculations and analyses regarding distances between the analysis target data; metric optimization means for optimizing correlations and attributes between the analysis target data and outputting the optimized metric matrix; and attribute clustering means for performing clustering of the optimized metric matrix according to the attributes, wherein
the metric application data analysis means is formed with: metric applying means for calculating the distance between the analysis target data by having the analysis target data and a Mahalanobis metric matrix showing the distance between the data as inputs; data analyzing means for analyzing the data according to a prescribed function by using the distance between the analysis target data and outputting a data analysis result; an analysis result storage means for saving the data analysis result; and metric matrix structuralizing means for inputting a metric matrix that is structuralized by approximating the original metric matrix to the metric applying means and the data analyzing means;
the metric optimization means is formed with: feedback converting means for creating side information according to a feedback command from a user constituted with either the correlations or the attributes between the analysis target data or with a combination thereof; and metric learning means for creating a metric matrix that is optimized under a prescribed condition based on the created side information;
a feedback command from a user regarding the attributes contains information about those that are supposed to belong to a same cluster between the analysis target data and information about a combination of a higher-order concept and a lower-order concept of the analysis target data;

the side information contains pair information that is information about data of two points to be in a same pair among the analysis target data, and group information that is information about data of two points or more to be in a same group among the analysis target data; and
the attribute clustering means performs clustering on the metric matrix that is optimized by the metric optimization means according to the attributes.

* * * * *